United States Patent
Chen et al.

(10) Patent No.: US 11,368,339 B2
(45) Date of Patent: Jun. 21, 2022

(54) SOUNDING REFERENCE SIGNAL TRANSMISSION METHOD, NETWORK DEVICE AND TERMINAL DEVICE

(71) Applicant: GUANGDONG OPPO MOBILE TELECOMMUNICATIONS CORP., LTD., Dongguan (CN)

(72) Inventors: Wenhong Chen, Dongguan (CN); Zhihua Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 126 days.

(21) Appl. No.: 16/930,078

(22) Filed: Jul. 15, 2020

(65) Prior Publication Data

US 2020/0351130 A1   Nov. 5, 2020

Related U.S. Application Data

(63) Continuation of application No. PCT/CN2018/073519, filed on Jan. 19, 2018.

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0092* (2013.01); *H04L 5/0094* (2013.01);
(Continued)

(58) Field of Classification Search
CPC . H04L 5/0092; H04L 5/0094; H04L 25/0226; H04W 72/042; H04W 72/0446; H04W 80/08
See application file for complete search history.

(56) References Cited

U.S. PATENT DOCUMENTS 9,270,356 B2 * 2/2016 Chung ................... H04W 76/27
9,306,651 B2 * 4/2016 Chung ................... H04L 5/0048
(Continued)

FOREIGN PATENT DOCUMENTS

CA    3042828 A1 *  5/2018  ........... H04B 7/0404
CA    3063502 A1 * 12/2019  ......... H04L 27/0008
(Continued)

OTHER PUBLICATIONS

3rd Generation Partnership Project; Technical Specification Group Radio Access Network; Evolved Universal Terrestrial Radio Access (E-UTRA); Physical layer procedures (Release 15); Jan. 16, 2018; Version 15.0.0, Technical Specification 36.213; pp. 1-7, 273-285, Section 8.2 (Year: 2018).*

(Continued)

*Primary Examiner* — Eric Nowlin (74) *Attorney, Agent, or Firm* — Morgan, Lewis & Bockius LLP (57) ABSTRACT

Provided are an SRS transmission method and device capable of realizing SRS transmission in a 5G system. The method comprises: receiving downlink control information (DCI) sent by a network device, wherein the DCI comprises SRS trigger information; and according to a transmission latency K, at or after a Kth time-domain resource unit after receiving the DCI, transmitting an SRS on an SRS resource in an SRS resource set indicated by the SRS trigger information, wherein K is an integer greater than or equal to zero.

16 Claims, 3 Drawing Sheets

(51) Int. Cl.
*H04W 72/04* (2009.01)
*H04W 80/08* (2009.01)

(52) U.S. Cl.
CPC ..... *H04W 72/042* (2013.01); *H04W 72/0446* (2013.01); *H04W 80/08* (2013.01)

(56) References Cited

U.S. PATENT DOCUMENTS

| | | | |
|---|---|---|---|
| 9,577,805 B2 * | 2/2017 | Chung | H04B 7/0684 |
| 10,367,616 B2 * | 7/2019 | Islam | H04W 52/36 |
| 10,506,566 B2 * | 12/2019 | Choi | H04L 5/005 |
| 10,574,412 B2 * | 2/2020 | Chung | H04W 76/27 |
| 10,778,475 B2 * | 9/2020 | Chen | H04L 1/0026 |
| 10,834,715 B2 * | 11/2020 | Sun | H04J 11/00 |
| 10,952,248 B2 * | 3/2021 | Wang | H04L 5/0048 |
| 11,165,532 B2 * | 11/2021 | Siomina | H04W 72/1205 |
| 11,223,506 B2 * | 1/2022 | Papasakellariou | H04L 27/2613 |
| 2011/0142095 A1 * | 6/2011 | Guo | H04B 7/0684 375/133 |
| 2012/0014349 A1 * | 1/2012 | Chung | H04B 7/0693 370/329 |
| 2013/0039304 A1 * | 2/2013 | Pan | H04W 72/1289 370/329 |
| 2013/0077574 A1 * | 3/2013 | Ekpenyong | H04L 5/0085 370/329 |
| 2013/0156014 A1 * | 6/2013 | Kim | H04L 5/0051 370/336 |
| 2014/0355545 A1 * | 12/2014 | Chung | H04B 7/0693 370/329 |
| 2015/0223213 A1 | 8/2015 | Moon et al. | |
| 2015/0229450 A1 * | 8/2015 | Noh | H04L 5/0051 370/329 |
| 2015/0333886 A1 | 11/2015 | Seo et al. | |
| 2016/0119100 A1 * | 4/2016 | Chung | H04L 5/0048 370/329 |
| 2017/0126382 A1 * | 5/2017 | Chung | H04B 7/0693 |
| 2017/0288833 A1 * | 10/2017 | Islam | H04W 72/04 |
| 2017/0302419 A1 * | 10/2017 | Liu | H04W 72/042 |
| 2018/0254863 A1 * | 9/2018 | Choi | H04L 5/005 |
| 2019/0037483 A1 * | 1/2019 | Li | H04L 5/0048 |
| 2019/0132103 A1 * | 5/2019 | Yang | H04L 5/0037 |
| 2019/0190582 A1 * | 6/2019 | Guo | H04W 76/19 |
| 2019/0190669 A1 * | 6/2019 | Park | H04B 7/0456 |
| 2019/0215110 A1 * | 7/2019 | Yang | H04W 76/27 |
| 2019/0245649 A1 * | 8/2019 | Siomina | H04B 17/104 |
| 2019/0273637 A1 * | 9/2019 | Zhang | H04B 7/022 |
| 2019/0320453 A1 * | 10/2019 | Hosseini | H04L 25/0202 |
| 2020/0322187 A1 * | 10/2020 | He | H04L 5/0055 |
| 2020/0382253 A1 * | 12/2020 | Manolakos | H04L 5/0051 |
| 2020/0412581 A1 * | 12/2020 | Zhang | H04W 72/14 |
| 2021/0105761 A1 * | 4/2021 | Cheng | H04L 5/0044 |
| 2021/0336820 A1 * | 10/2021 | Lim | H04L 5/0051 |

FOREIGN PATENT DOCUMENTS

| | | | | |
|---|---|---|---|---|
| CN | 101547022 A | * | 9/2009 | H04L 5/0048 |
| CN | 101677458 A | * | 3/2010 | H04L 5/0048 |
| CN | 102088303 A | * | 6/2011 | H04L 5/0048 |
| CN | 102088303 A | | 6/2011 | |
| CN | 103002585 A | * | 3/2013 | |
| CN | 103002585 A | | 3/2013 | |
| CN | 103210694 A | | 7/2013 | |
| CN | 101547022 B | * | 3/2014 | H04L 5/0048 |
| CN | 103647626 A | * | 3/2014 | H04L 5/0048 |
| CN | 103945541 A | * | 7/2014 | |
| CN | 103945541 A | | 7/2014 | |
| CN | 103647626 B | * | 1/2017 | H04L 5/0048 |
| CN | 103945541 B | * | 9/2017 | |
| CN | 109600826 A | * | 4/2019 | H04L 5/0092 |
| CN | 110691405 A | * | 1/2020 | H04L 5/0092 |
| JP | 2012100232 A | | 5/2012 | |
| RU | 2632904 C2 | | 10/2017 | |
| WO | WO2017026762 A1 | | 2/2017 | |

OTHER PUBLICATIONS

Ericsson, On SRS Bandwidth Table Design, Oct. 9, 2017, 3GPP TSG RAN WG1 Meeting 90bis, Tdoc: R1-1718752 (Year: 2017).*
Ericsson et al., Way Forward (WF) on SRS for NR, Oct. 9, 2017, 3GPP TSG RAN WG1 Meeting 90bis, Tdoc: R1-1718968 (Year: 2017).*
Catt, Offline discussion on SRS configuration table, Oct. 9, 2017, 3GPP TSG RAN WG1 Meeting 90bis, Tdoc: R1-1719149 (Year: 2017).*
Ericsson, Remaining Issues of SRS Power Control, Nov. 27, 2017, 3GPP TSG-RAN WG1 #91, Tdoc: R1-1721034 (Year: 2017).*
Sony, Summary of SRS, Nov. 27, 2017, 3GPP TSG-RAN WG1 #91, Tdoc: R1-1721353 (Year: 2017).*
Ericsson, Remaining details on SRS design, Nov. 27, 2017, 3GPP TSG-RAN WG1 #91, Tdoc: R1-1721384 (Year: 2017).*
3rd Generation Partnership Project, Technical Specification Group Radio access Network, Evolved Universal Terrestrial Radio Access (E-UTRA), Physical Layer procedures (Release 13), 3GPP TS 36.213 V13.5.0 (Mar. 2017), 218 pgs.
3rd Generation Partnership Project, Technical Specification Group Radio Access Network, NR, Physical layer procedures for data (Release 15), 3GPP TS 38.214 V15.0.0 (Dec. 2017), 71 pgs.
Oppo, Text proposal for SRS, 3GPP TSG RAN WG1, Meeting AH 1801, R1-1800485, Vancouver, Canada, Jan. 22-26, 2018, 9 pgs.
Guangdong OPPO Mobile Telecommunications Corp. Ltd., Requisition by the Examiner, CA3088813, Aug. 20, 2021, 4 pgs.
Guangdong OPPO Mobile Telecommunications Corp. Ltd., Examination Report, IN202027033385, dated Aug. 23, 2021, 5 pgs.
Guangdong OPPO Mobile Telecommunications Corp. Ltd., Extended European Search Report, EP18901307.1, dated Nov. 20, 2020, 11 pgs.
Huawei, HiSilicon, "Summary of remaining details of SRS design," 3GPP TSG RAN WG1 Ad Hoc Meeting, R1-1800090, Vancouver, Canada, Jan. 22-26, 2018, 12 pgs.
Nokia, Nokia Shanghai Bell, Remaining details on SRS design in NR, 3GPP TSG RAN WG1 Meeting #91, R1-1720897, Reno, Nevada, USA, Nov. 27-Dec. 1, 2017, 7 pgs.
Guangdong OPPO Mobile Telecommunications Corp. Ltd., First Office Action, CN202010463069.3, dated Jun. 29, 2021, 15 pgs.
Guangdong OPPO Mobile Telecommunications Corp. Ltd., Official Action, RU2020127098/07, dated Jun. 2, 2021, 10 pgs.
Guangdong OPPO Mobile Telecommunications Corp. Ltd., International Search Report and Written Opinion, PCTCN2018073519, dated Apr. 27, 2018, 9 pgs.
Catt, Remaining issues on non-codebook based UL transmission, 3GPP TSG RAN WG1 Meeting AH 1801, R1-1800238, Vancouver, Canada, Jan. 22-26, 2018, 5 pgs.
Notice of Reasons for Refusal, JP2020-539710, dated Jan. 7, 2022, 10 pgs.
Vivo, Remaining issues and text proposals on SRS design, 3GPP TSG RAN WG1 Meeting AH 1801, R1-1800192, Vancouver, Canada, Jan. 22-26, 2018, 7 pgs.

* cited by examiner

SOUNDING REFERENCE SIGNAL TRANSMISSION METHOD, NETWORK DEVICE AND TERMINAL DEVICE

CROSS-REFERENCE TO RELATED APPLICATIONS

The present application is a continuation of PCT Application No. PCT/CN2018/073519, filed on Jan. 19, 2018, the content of which is hereby incorporated by reference in its entirety.

TECHNICAL FIELD

The present application relates to the field of communications, and more particularly, to a sounding reference signal (SRS) transmission method, a network device, and a terminal device.

BACKGROUND

In the Long Term Evolution (LTE) system, an aperiodic sounding reference signal (SRS) transmission is introduced, and the base station can trigger the SRS transmission of the terminal by using Downlink Control Information (DCI). After receiving the SRS trigger signaling, the terminal performs SRS transmission. The SRS may be used to obtain Channel State Information (CSI), or used for beam management.

SUMMARY

Embodiments of the present application provide an SRS transmission method and device.

In a first aspect, there is provided an SRS transmission method, including:

receiving downlink control information (DCI) sent by a network device, wherein the DCI includes SRS trigger information; and according to a transmission latency K, at or after a Kth time-domain resource unit after receiving the DCI, transmitting an SRS on an SRS resource in an SRS resource set indicated by the SRS trigger information, wherein K is an integer greater than or equal to zero.

With reference to the first aspect, in a possible implementation manner of the first aspect, the method further includes:

obtaining the transmission latency K from the DCI.

With reference to the first aspect or any one of the foregoing possible implementations, in another possible implementation manner of the first aspect, the obtaining the transmission latency K from the DCI includes:

obtaining the transmission latency K from SRS transmission latency indication information in the DCI.

With reference to the first aspect or any one of the foregoing possible implementations, in another possible implementation manner of the first aspect, the obtaining the transmission latency K from the DCI includes:

determining a transmission latency M of a physical uplink shared channel (PUSCH) from PUSCH time-domain resource indication information in the DCI; and determining the transmission latency K, based on the transmission latency M.

With reference to the first aspect or any one of the foregoing possible implementations, in another possible implementation manner of the first aspect, the method further includes:

determining the transmission latency K according to a first high layer signaling.

With reference to the first aspect or any of the foregoing possible implementations, in another possible implementation manner of the first aspect, the determining the transmission latency K according to the first high layer signaling includes:

determining the transmission latency K from the SRS transmission latency indication information in the first high layer signaling.

With reference to the first aspect or any of the foregoing possible implementations, in another possible implementation manner of the first aspect, the determining the transmission latency K according to the first high layer signaling includes:

determining a manner for obtaining the transmission latency K from the first high layer signaling; and determining the transmission latency K by using the manner determined above.

With reference to the first aspect or any of the foregoing possible implementations, in another possible implementation manner of the first aspect, the manner for obtaining the transmission latency K is:

obtaining the transmission latency K from the DCI; or obtaining the transmission latency K from a second high layer signaling; or using an agreed fixed value as the transmission latency K.

With reference to the first aspect or any one of the foregoing possible implementations, in another possible implementation manner of the first aspect, the method further includes:

determining the transmission latency K according to a DCI format of the DCI.

With reference to the first aspect or any one of the foregoing possible implementations, in another possible implementation of the first aspect, the determining the transmission latency K according to the DCI format of the DCI includes:

determining the transmission latency M of the PUSCH from the PUSCH time-domain resource indication information in the DCI, if the DCI format of the DCI is used to schedule PUSCH transmission; and determining the transmission latency K, based on the transmission latency M.

With reference to the first aspect or any one of the foregoing possible implementations, in another possible implementation manner of the first aspect, the determining the transmission latency K according to the DCI format of the DCI includes:

determining the transmission latency K from a third high layer signaling, or using an agreed fixed value as the transmission latency K, if the DCI format of the DCI is used to schedule physical downlink shared channel (PDSCH) transmission.

With reference to the first aspect or any one of the foregoing possible implementations, in another possible implementation manner of the first aspect, the determining the transmission latency K according to the DCI format of the DCI includes:

determining the transmission latency K from a third high layer signaling, or using an agreed fixed value as the transmission latency K, if the DCI format of the DCI is used for SRS power control.

With reference to the first aspect or any one of the foregoing possible implementations, in another possible implementation manner of the first aspect, the method further includes:

determining the transmission latency K, according to a subcarrier spacing used to for SRS transmission triggered by the SRS trigger information, or according to a subcarrier spacing corresponding to a bandwidth part (BWP) receiving the DCI.

With reference to the first aspect or any one of the foregoing possible implementations, in another possible implementation manner of the first aspect, the transmitting the SRS on the SRS resource in the SRS resource set indicated by the SRS trigger information includes:

transmitting the SRS on a closest resource in each of the SRS resources included in each of the SRS resource sets indicated by the SRS trigger information, at or after the Kth time-domain resource unit.

With reference to the first aspect or any one of the foregoing possible implementations, in another possible implementation manner of the first aspect, the transmitting the SRS on the SRS resource in the SRS resource set indicated by the SRS trigger information includes:

transmitting the SRS on the SRS resource in a closest transmission period or frequency hopping period in each of the SRS resource sets indicated by the SRS trigger information, at or after the Kth time-domain resource unit.

With reference to the first aspect or any one of the foregoing possible implementations, in another possible implementation manner of the first aspect, the transmitting the SRS on the SRS resource in the SRS resource set indicated by the SRS trigger information includes:

transmitting an SRS signal on each of the SRS resources included in each of the SRS resource sets indicated by the SRS trigger information, at the Kth time-domain resource unit, wherein the time-domain resource unit is a slot.

With reference to the first aspect or any one of the foregoing possible implementations, in another possible implementation manner of the first aspect, the transmitting the SRS on the SRS resource in the SRS resource set indicated by the SRS trigger information includes:

transmitting the SRS on the SRS resource in the SRS resource set indicated by the SRS trigger information in a slot where the DCI is located, if a value of K is zero, wherein the time-domain resource unit is the slot.

With reference to the first aspect or any one of the foregoing possible implementations, in another possible implementation manner of the first aspect, the method further includes:

performing power control on the SRS transmission by using a TPC command, if the DCI further includes a transmission power control TPC command for SRS power control.

With reference to the first aspect or any one of the foregoing possible implementations, in another possible implementation manner of the first aspect, the transmitting the SRS on the SRS resource in the SRS resource set indicated by the SRS trigger information includes:

transmitting the SRS on the SRS resource in a currently activated bandwidth part (BWP), if the SRS trigger information has indicated the SRS resource sets on a plurality of BWPs, or has indicated the SRS resource set including the SRS resources on a plurality of BWPs.

With reference to the first aspect or any one of the foregoing possible implementations, in another possible implementation manner of the first aspect, the SRS trigger information is configured to trigger aperiodic SRS transmission on at least one SRS resource set.

With reference to the first aspect or any one of the foregoing possible implementations, in another possible implementation manner of the first aspect, the time-domain resource unit is a slot, or a sub-frame, or an orthogonal frequency division multiplexed (OFDM) symbol, or a micro slot, or PUSCH/PDSCH transmission duration.

In a second aspect, a method for transmitting a sounding reference signal (SRS) is provided, including:

sending downlink control information (DCI) to a terminal device, wherein the DCI includes SRS trigger information;

according to a transmission latency K, at or after a Kth time-domain resource unit after sending the DCI, receiving an SRS on an SRS resource in an SRS resource set indicated by the SRS trigger information, wherein K is an integer greater than or equal to zero.

With reference to the second aspect, in a possible implementation manner of the second aspect, the method further includes:

indicating the transmission latency K by using the DCI.

With reference to the second aspect or any one of the foregoing possible implementations, in another possible implementation manner of the second aspect, the indicating the transmission latency K by using the DCI includes:

indicating the transmission latency K by using SRS transmission latency indication information in the DCI.

With reference to the second aspect or any one of the foregoing possible implementations, in another possible implementation manner of the second aspect, the method further includes:

indicating the transmission latency K by using a first high layer signaling.

With reference to the second aspect or any one of the foregoing possible implementations, in another possible implementation manner of the second aspect, the method further includes:

indicating a manner for the terminal device to obtain the transmission latency K by using a second high layer signaling.

With reference to the second aspect or any of the foregoing possible implementations, in another possible implementation manner of the second aspect, the manner for the terminal device to obtain the transmission latency K is:

obtaining the transmission latency K from the DCI; or, obtaining the transmission latency K from a third high layer signaling; or, using an agreed fixed value as the transmission latency K.

With reference to the second aspect or any one of the foregoing possible implementations, in another possible implementation manner of the second aspect, the method further includes:

determining the transmission latency K, based on a DCI format of the DCI.

With reference to the second aspect or any one of the foregoing possible implementations, in another possible implementation manner of the second aspect, the DCI format of the DCI is used to schedule physical uplink shared channel (PUSCH) transmission, and the method further includes:

determining the transmission latency K, based on the transmission latency M of the PUSCH.

With reference to the second aspect or any one of the foregoing possible implementations, in another possible implementation manner of the second aspect, the DCI format of the DCI is used to schedule PDSCH transmission, and the method further includes:

indicating the transmission latency K in the third high layer signaling; or using an agreed fixed value as the transmission latency K.

With reference to the second aspect or any one of the foregoing possible implementations, in another possible implementation manner of the second aspect, the DCI format of the DCI is used for SRS power control, and the method further includes:

indicating the transmission latency K in the third high layer signaling; or using an agreed fixed value as the transmission latency K.

With reference to the second aspect or any one of the foregoing possible implementations, in another possible implementation manner of the second aspect, the method further includes:

determining the transmission latency K, according to a subcarrier spacing used for the triggered SRS, or according to a subcarrier spacing corresponding to a BWP of the DCI.

With reference to the second aspect or any one of the foregoing possible implementations, in another possible implementation manner of the second aspect, the receiving the SRS on the SRS resource in the SRS resource set indicated by the SRS trigger information includes:

receiving the SRS on a closest resource in each of the SRS resources included in each of the SRS resource sets indicated by the SRS trigger information, at or after the Kth time-domain resource unit.

With reference to the second aspect or any one of the foregoing possible implementations, in another possible implementation manner of the second aspect, the receiving the SRS on the SRS resource in the SRS resource set indicated by the SRS trigger information includes:

receiving the SRS on the SRS resource in a closest transmission period or frequency hopping period in each of the SRS resource sets indicated by the SRS trigger information, at or after the Kth time-domain resource unit.

With reference to the second aspect or any one of the foregoing possible implementations, in another possible implementation manner of the second aspect, the receiving the SRS on the SRS resource in the SRS resource set indicated by the SRS trigger information includes:

receiving the SRS on each of the SRS resources included in each of the SRS resource sets indicated by the SRS trigger information, at the Kth time-domain resource unit, wherein the time-domain resource unit is a slot.

With reference to the second aspect or any one of the foregoing possible implementations, in another possible implementation manner of the second aspect, the receiving the SRS on the SRS resource in the SRS resource set indicated by the SRS trigger information includes:

receiving the SRS on the SRS resource in a currently activated BWP, if the SRS trigger information has indicated the SRS resource sets on a plurality of BWPs, or has indicated the SRS resource set including the SRS resources on a plurality of BWPs.

With reference to the first aspect or any one of the foregoing possible implementations, in another possible implementation manner of the first aspect, the time-domain resource unit is a slot, or a sub-frame, or an orthogonal frequency division multiplexed (OFDM) symbol, or a micro slot, or PUSCH/PDSCH transmission duration.

In a third aspect, a terminal device is provided, and the terminal device may include a unit for implementing the method in the foregoing first aspect or any possible implementation manner thereof.

In a fourth aspect, a network device is provided, and the network device may include a unit for implementing the method in the foregoing second aspect or any possible implementation manner thereof.

In a sixth aspect, a terminal device is provided, and the terminal device may include a memory and a processor. The memory stores instructions, and the memory is configured to call the instructions stored in the memory to execute the method in the first aspect or any optional implementation manner thereof.

In a seventh aspect, a computer-readable medium is provided, wherein the computer-readable medium stores program code for execution by a terminal device, and the program code includes instructions for performing the method in the first aspect or various implementations thereof, or includes instructions for performing the method of the second aspect or various implementations thereof.

In an eighth aspect, a system chip is provided, wherein the system chip includes an input interface, an output interface, a processor, and a memory. The processor is configured to execute code in the memory. When the code is executed, the processor may implement the method in the first aspect and various implementations, or implement the method in the second aspect and various implementations.
transmission latency

DETAILED DESCRIPTION

The technical solutions in the embodiments of the present application will be described below with reference to the drawings in the embodiments of the present application.

The technical solutions in the embodiments of the present application can be applied to various communication systems, such as, a Global System of Mobile communication (GSM) system, and a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system or a future 5G system, etc.

Figure 1:
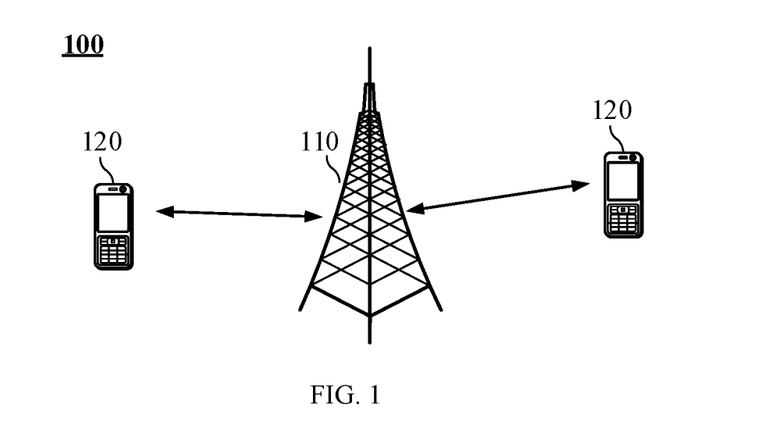
FIG. 1 is a schematic diagram of a wireless communication system according to an embodiment of the present application.

FIG. 1 shows a wireless communication system 100 applied in an embodiment of the present application. The wireless communication system 100 may include a network device 110. The network device 110 may be a device that communicates with a terminal device. The network device 110 may provide communication coverage for a specific geographic area, and may communicate with terminal devices (such as UEs) located within the coverage area. In one embodiment, the network device 110 may be a base station (Base Transceiver Station, BTS) in a GSM system or a CDMA system, or a base station (NodeB, NB) in a WCDMA system, or an evolved base station in an LTE system (Evolutional Node B, eNB or eNodeB), or a wireless controller in a Cloud Radio Access Network (CRAN), or the network device may be a relay station, an access point, a vehicle-mounted device, a wearable device, network-side equipment in a future 5G network or network device in a future evolved Public Land Mobile Network (PLMN).

The wireless communication system 100 further includes at least one terminal device 120 located within the coverage area of the network device 110. The terminal device 120 may be mobile or fixed. In one embodiment, the terminal device 120 may refer to an access terminal, a user equipment (UE), a user unit, a user station, a mobile station, a mobile station, a remote station, a remote terminal, a mobile device, a user terminal, a terminal, and a wireless communication device, user agent, or a user device. The access terminal can be a cellular phone, a cordless phone, a Session Initiation Protocol (SIP) phone, a Wireless Local Loop (WLL) station, a Personal Digital Assistant (PDA), communication-enabled handheld devices, computing devices, or other processing devices connected to a wireless modem, in-vehicle devices, wearable devices, terminal devices in future 5G networks, or terminal devices in future evolved PLMNs.

In one embodiment, the terminal devices 120 may perform Device to Device (D2D) communication.

In one embodiment, a 5G system or network may also be referred to as a new radio (New Radio, NR) system or network.

FIG. 1 exemplarily shows a network device and two terminal devices. In one embodiment, the wireless communication system 100 may include a plurality of network devices and other number of terminal devices may be included in coverage area of each of the network devices, which is not limited in this embodiment of the present application.

In the wireless communication system 100, a terminal device may have one or more antenna array blocks for uplink data transmission, and each of the antenna array blocks has an independent radio frequency channel. A demodulation reference signal (DMRS) port group corresponds to one of the antenna array blocks. After determining transmission parameters of one antenna array block, the terminal device can transmit data of corresponding DMRS port group on the antenna array block.

In one embodiment, the wireless communication system 100 may further include other network entities, such as a network controller and a mobility management entity, which are not limited in this embodiment of the present application.

It should be understood that the terms "system" and "network" are often used interchangeably herein. The term "and/or" in this document is only a kind of association relationship describing related objects, which means that there can be three kinds of relationships, for example, A and/or B can mean: A exists alone, A and B exist simultaneously, and B exists alone of these three cases. In addition, the character "/" in this text generally indicates that the related objects are an "or" relationship.

Figure 2:
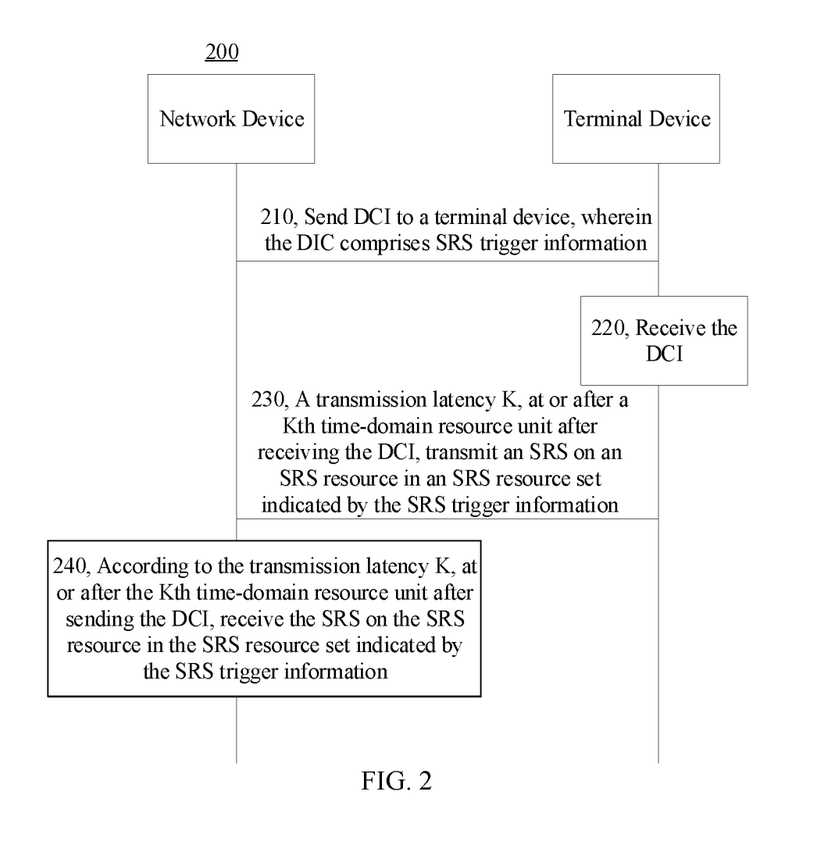
FIG. 2 is a schematic flowchart of an SRS transmission method according to an embodiment of the present application.

FIG. 2 is a schematic flowchart of an SRS transmission method 200 according to an embodiment of the present application. The method 200 includes at least part of the following content.

In 210, a network device sends Downlink Control Information (DCI) to a terminal device, and the DCI includes SRS trigger information.

In one embodiment, an SRS resource set indicated by the SRS trigger information may be one or more.

In one embodiment, the SRS trigger information is used to trigger aperiodic SRS transmission on at least one of the SRS resource sets.

For example, the SRS trigger information includes 2 DCI bits, a total of four indication values, of which three indication values are used to trigger different SRS resource sets, and one indication value is used to indicate that the aperiodic SRS transmission is not triggered.

In one embodiment, in the embodiment of the present application, one of the SRS resource sets may include at least one SRS resource, and each of the SRS resources may have an independent configuration compared to other SRS resources, for example, an SRS sending cycle, a triggering method, or an amount of resources occupied by one-time SRS transmission.

In one embodiment, the aperiodic SRS refers to an SRS triggered by trigger information (or signaling), and may be one-time transmission or multiple-time transmission.

In one embodiment, the SRS transmission triggered by one SRS trigger information may be completed in one slot, or may be performed in a plurality of slots, depending on configuration of the SRS resources or configuration of transmission latency.

It should be understood that the SRS trigger information mentioned in the embodiments of the present application may also be carried in other signaling than DCI, for example, it may be carried in Media Access Control (MAC) signaling.

In 220, the terminal device receives the DCI sent by the network device.

In 230, according to a transmission latency K, at or after a Kth time-domain resource unit after sending the DCI, the terminal device transmits an SRS on the SRS resource in the SRS resource set indicated by the SRS trigger information, wherein K is an integer greater than or equal to zero.

In one embodiment, the time-domain resource unit mentioned in the embodiments of the present application is a slot, or a sub-frame, or an orthogonal frequency division multiplexed (OFDM) symbol, or a micro slot, or Physical Uplink Shared Channel (PUSCH)/Physical Downlink Shared Channel (PDSCH) transmission duration.

Wherein, the PUSCH/PDSCH transmission duration is transmission time used for one PUSCH transmission or PDSCH transmission.

In order to understand this application more clearly, several methods for obtaining the transmission latency K will be described below.

In an implementation manner, the terminal device obtains the transmission latency K from the DCI carrying the SRS trigger information. In other words, the network device can use the DCI to indicate the transmission latency K.

In one embodiment, the terminal device may obtain the transmission latency K from SRS transmission latency indication information in the DCI carrying the SRS trigger information. That is, the network device uses the SRS transmission latency indication information in the DCI to indicate the transmission latency K.

Specifically, the DCI may have a field, which may be used to carry the SRS transmission latency indication information, and the terminal device may obtain the transmission latency K from the field.

Wherein, the SRS transmission latency indication information may indicate currently used transmission latency (that is, the value of K) from N candidate values, and the N candidate values may be preset on the terminal device and the network device, or the network device notifies the terminal device through high layer signaling.

Alternatively, the terminal device may determine transmission latency M of the PUSCH from PUSCH time-domain resource indication information in the DCI carrying the SRS trigger information; the transmission latency K is determine, based on the transmission latency M. The PUSCH time-domain resource indication information is used to indicate a transmission latency between the DCI and the scheduled PUSCH transmission. Correspondingly, the network device may also determine the latency K based on the transmission latency M, or use the transmission latency K to determine the transmission latency M.

Specifically, the DCI may have a field, which may be used to carry the PUSCH time-domain resource indication information. Based on the information, the terminal device determines the transmission latency M of the PUSCH (that is, at the Mth time-domain resource unit after receiving the DCI scheduling the PUSCH, transmit PUSCH), and then determines the transmission latency K.

For example, it is assumed that the transmission latency of the PUSCH indicated by the PUSCH time-domain resource indication information is M, the value of the transmission latency K may be K=M−k, where k is a fixed integer value. For example, the typical value of k is 0 or 1, that is, the triggered SRS can be transmitted in the same time-domain resource unit of the scheduled PUSCH, or transmitted in the previous time-domain resource unit of the scheduled PUSCH.

In an implementation manner, the terminal device determines the transmission latency K according to a first high layer signaling.

In one embodiment, the terminal device determines the transmission latency K from the SRS transmission latency indication information in the first higher layer signaling. That is, the SRS transmission latency indication information directly indicates the value of K. That is, the network device can use the first high layer signaling to indicate the transmission latency K.

In one embodiment, the terminal device determines the transmission latency K according to the first high layer signaling and the BWP where the terminal transmits the SRS. If the terminal device is configured with a plurality of uplink BWPs, the network side needs each of the uplink BWPs to indicate the corresponding transmission latency K. When the terminal transmits SRS on an uplink BWP, the transmission latency K corresponding to the BWP is used.

In one embodiment, the terminal device determines a method for obtaining the transmission latency K from the first high layer signaling; and uses the determined method to determine the transmission latency K. That is, the network device can use the first high layer signaling to indicate the terminal device to obtain the transmission latency K.

In one embodiment, the terminal device determines a method for obtaining the transmission latency K according to the first high layer signaling and the BWP where the terminal transmits the SRS. If the terminal device is configured with the plurality of uplink BWPs, a corresponding transmission latency obtaining method indicated for each of the uplink BWPs through the first high layer signaling is needed. When the terminal transmits the SRS on an uplink BWP, the transmission latency obtaining method corresponding to the BWP is used to obtain the transmission latency.

The method for obtaining the transmission latency K may be: obtaining the transmission latency K from the DCI; or obtaining the transmission latency K from a second high layer signaling; or using an agreed fixed value as the transmission latency K.

Specifically, the second high layer signaling is used to determine the method for obtaining the transmission latency K from at least two of the following three methods:

1) obtaining the transmission latency K from the DCI, wherein the specific obtaining method can refer to the description above;

2) obtaining the transmission latency K from a third high layer signaling; specifically, the terminal device determines the transmission latency K according to the SRS transmission latency indication information in the third high layer signaling;

3) using an agreed fixed value as the transmission latency K. For example, the agreed fixed value may be K=0 or K=4. For example, the second high layer signaling may include 1-bit indication information, which is used to indicate that the foregoing method 1) or method 3) is used to determine the transmission latency K.

In an implementation manner, the terminal device determines the transmission latency K according to the DCI format of the DCI carrying the SRS trigger information.

In one embodiment, when the DCI uses different DCI formats, the corresponding methods for determining the transmission latency K are also different. Then, the network device may determine the manner of indicating the transmission latency K according to the format of the DCI carrying the SRS indication information.

In one embodiment, if the DCI format of the DCI is used to schedule PUSCH transmission (for example, DCI format 0_0 or DCI format 0_1), transmission latency M of the PUSCH is determined from the PUSCH time-domain resource indication information in the DCI; the transmission latency K is determined, based on the transmission latency M of the PUSCH.

Specifically, the PUSCH time-domain resource indication information in the DCI is used to indicate a transmission latency between the DCI and the scheduled PUSCH transmission.

It is assumed that the PUSCH transmission latency indicated by the PUSCH time-domain resource indication information is M, the value of the transmission latency K may be K=M−k, where k is a fixed integer value. For example, the typical value of k is 0 or 1, that is, the triggered SRS can be transmitted in the same time-domain resource unit of scheduled PUSCH, or transmitted in the previous time-domain resource unit of the scheduled PUSCH.

In one embodiment, if the DCI format of the DCI is used to schedule the PDSCH transmission (for example, DCI format 1_0 or DCI format 1_1), the transmission latency K is determined from the third high layer signaling, or the agreed fixed value is used as the transmission latency K. The agreed fixed value may be K=0 or K=4.

In one embodiment, if the DCI format of the DCI is used for SRS power control (for example, DCI format 2_2), the transmission latency K is determined from the third high layer signaling, or the agreed fixed value is used as the transmission latency K.

Specifically, the DCI format includes a TPC (Transmit Power control) command for SRS power control, and also includes aperiodic SRS trigger signaling.

In an implementation manner, the terminal device determines the transmission latency K according to a subcarrier spacing used to transmit the triggered SRS, or according to a subcarrier spacing corresponding to a BWP that receives the DCI. Accordingly, the network device determines the transmission latency K according to the subcarrier spacing used to transmit the triggered SRS, or according to the subcarrier spacing corresponding to the BWP of the DCI.

Specifically, the subcarrier spacing may be a subcarrier spacing used for transmitting the aperiodic SRS, that is, a subcarrier spacing corresponding to a BWP where the aperiodic SRS is located; or may also be the subcarrier spacing configured for transmitting the BWP of the DCI by the network side.

For example, if target subcarrier spacing is S and reference subcarrier spacing is N, the transmission latency may be expressed as K=S/N*k, where k is the transmission latency under the assumption of the reference subcarrier spacing, which may be determined according to the aforementioned method. Generally, the reference subcarrier spacing is 15 kHz.

For example, the terminal device and the network side can agree on different transmission latencies for different target subcarrier spacings (that is, a fixed transmission latency is used for each of the subcarrier spacings), or the network side configures different transmission latencies for different subcarrier spacings through the high layer signaling.

In order to understand this application more clearly, the following will introduce how to perform SRS transmission after obtaining the transmission latency K.

In an implementation manner, an SRS signal is transmitted on a closest resource in each of the SRS resources included in each of the SRS resource sets indicated by the SRS trigger information (the closest in time, that is, in the physical resource occupied by an SRS resource, the earliest physical resource in time at or after the Kth time-domain resource unit), at or after the Kth time-domain resource unit.

Specifically, it is assumed that the trigger signaling indicates a first SRS resource set, the first SRS resource set includes N periodically configured SRS resources, and at or after the Kth time-domain resource unit, the terminal device needs to transmit the SRS signal on a closest resource based on the N SRS resources, respectively. That is, the terminal needs to transmit the SRS signal on the resources occupied by the N SRS resources, but only needs to transmit in a closest transmission period or a closest frequency hopping period of each of the SRS resources.

If the terminal device transmits in the closest transmission period of each of the SRS resources, the terminal device transmits the SRS on a plurality of OFDM symbols included in one of the SRS resources in one slot. In this case, the closest resource here refers to the closest S symbols included in the SRS resource, and S is the number of symbols occupied by the SRS resource in one slot.

If the terminal device transmits in the closest frequency hopping period of each of the SRS resources, the terminal device may transmit the SRS in the closest one or more slots containing the SRS resource until the transmission covers the entire frequency hopping bandwidth. In this case, the closest resource here refers to the N symbols recently included in the SRS resource, and N is the number of symbols required to perform a complete frequency-domain frequency hopping.

In one embodiment, if the trigger signaling has indicated a plurality of SRS resource sets, the terminal device may perform the SRS transmission mentioned above for each of the SRS resource sets.

In an implementation manner, at or after the Kth time-domain resource unit, the terminal device transmits SRS on the SRS resource in the closest transmission period or frequency hopping period of each of the SRS resource sets indicated by the SRS trigger information.

In an implementation manner, if the value of K is 0, the SRS is transmitted on the SRS resource in the SRS resource set indicated by the SRS trigger information in the slot where the DCI is located, wherein the time-domain resource unit is a slot.

In an implementation manner, at the Kth time-domain resource unit, the terminal device transmits an SRS signal on each of the SRS resources included in each of the SRS resource sets indicated by the SRS trigger information, wherein the time-domain resource unit is a slot.

In an implementation manner, if the SRS trigger information has indicated the SRS resource set on a plurality of BWPs, or has indicated the SRS resource set including the SRS resources on the plurality of BWPs, the SRS is transmitted on the SRS resource in the currently activated BWP.

For example, the SRS trigger information indicates two sets of SRS resources, which are respectively on different BWPs, and only one of which is currently activated, and the terminal performs the aperiodic SRS transmission only on the activated BWP.

For example, the SRS trigger information indicates one SRS resource set, and the SRS resource set includes two SRS resources on different BWPs, and the terminal performs SRS transmission on the corresponding SRS resources only on the activated BWP.

In another implementation manner, if the SRS trigger information indicates the SRS resource set on the plurality of BWPs, or the SRS resource set including the SRS resources on the plurality of BWPs, the terminal needs to transmit SRS on all SRS resource sets or all SRS resources on the plurality of BWPs.

In one embodiment, in the embodiment of the present application, if the DCI for carrying the SRS trigger information further includes a TPC command of transmission power control for SRS power control, the TPC command is used to perform power control on the SRS transmission.

In 240, according to the transmission latency K, at or after the Kth time-domain resource unit after sending the DCI, the network device receives the SRS on the SRS resource in the SRS resource set indicated by the SRS trigger information, wherein K is an integer greater than or equal to 0.

In an implementation manner, at or after the Kth time-domain resource unit, the SRS signal is received on the closest resource in each of the SRS resources included in each of the SRS resource sets indicated by the SRS trigger information.

In an implementation manner, at or after the Kth time-domain resource unit, the network device receives the SRS on the SRS resource in the closest transmission period or frequency hopping period of each of the SRS resource sets indicated by the SRS trigger information.

In an implementation manner, at the Kth time-domain resource unit, an SRS signal is received on each of the SRS resources included in each of the SRS resource sets indicated by the SRS trigger information, and the time-domain resource is a slot.

In an implementation manner, if the SRS trigger information indicates the SRS resource set on the plurality of BWPs, or indicates the SRS resource set including the SRS resources on the plurality of BWPs, the SRS is received on the SRS resource in the currently activated BWP.

It can be seen from the above scheme that the embodiment of the present application can flexibly adjust the transmission latency of aperiodic SRS, thereby reducing the channel state information (CSI) delay of uplink and downlink data transmission, and improving the transmission spectrum efficiency and improving the utilization of uplink resources.

Figure 3:
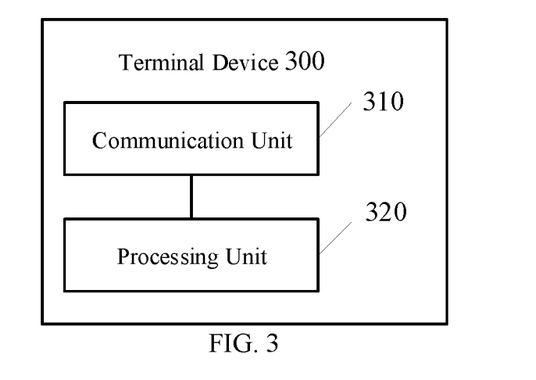
FIG. 3 is a schematic block diagram of a terminal device according to an embodiment of the present application.

FIG. 3 is a schematic block diagram of a terminal device 300 according to an embodiment of the present application. The terminal device 300 includes a communication unit 310 and a processing unit 320. The communication unit 310 is configured to: receive downlink control information (DCI)

sent by a network device, wherein the DCI includes SRS trigger information; and the processing unit 320 is configured to: determine a transmission latency K, where K is an integer greater than or equal to 0; the communication unit 310 is further configured to: according to the transmission latency K, at or after a Kth time-domain resource unit after receiving the DCI, transmit an SRS on an SRS resource in an SRS resource set indicated by the SRS trigger information, wherein K is an integer greater than or equal to zero.

It should be understood that the terminal device 300 according to the embodiment of the present application may correspond to the terminal device in the method embodiment of the present application, and the above and other operations and/or functions of each unit in the terminal device 300 are to implement corresponding process of the terminal device in the method 200 shown in FIG. 2 respectively, which is not repeated here for brevity.

Figure 4:
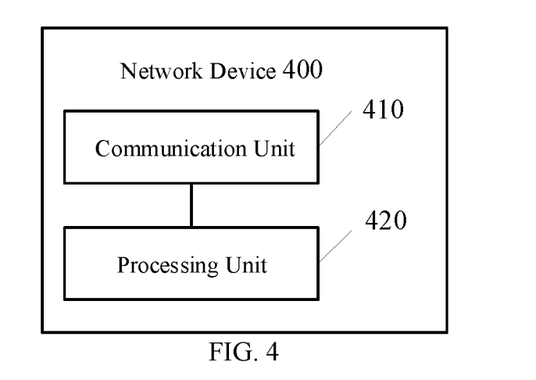
FIG. 4 is a schematic block diagram of a network device according to an embodiment of the present application.

FIG. 4 is a schematic block diagram of a network device 400 according to an embodiment of the present application. The network device 400 includes a communication unit 410 and a processing unit 420.

The communication unit 410 is configured to send downlink control information DCI to a terminal device, wherein the DCI includes SRS trigger information; the processing unit 420 is configured to determine a transmission latency K; and the communication unit 410 is further configured to: according to the transmission latency K, at or after a Kth time-domain resource unit after receiving the DCI, receive an SRS on an SRS resource in an SRS resource set indicated by the SRS trigger information, wherein K is an integer greater than or equal to zero.

It should be understood that the network device 400 according to the embodiment of the present application may correspond to the network device in the embodiment of the method of the present application, and the above and other operations and/or functions of each unit in the network device 400 implement corresponding process of the network device in the method 200 shown in FIG. 2 respectively, which is not repeated here for brevity.

Figure 5:
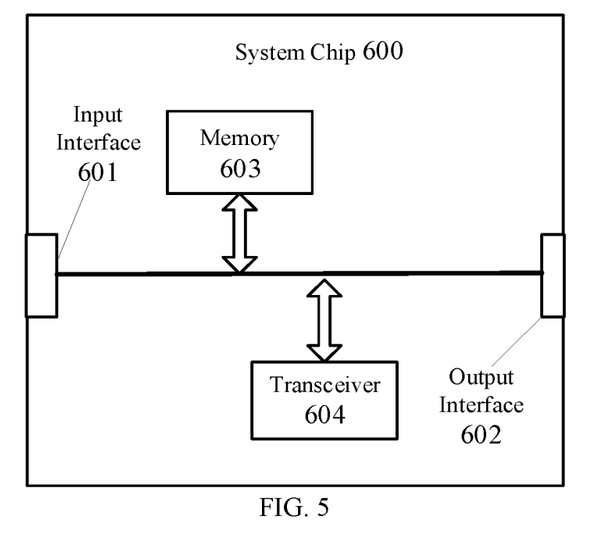
FIG. 5 is a schematic block diagram of a system chip according to an embodiment of the present application.

FIG. 5 is a schematic structural diagram of a system chip 600 according to an embodiment of the present application. The system chip 600 in FIG. 5 includes an input interface 601, an output interface 602, a processor 603 and a memory 604. The processor 603 and the memory 604 are connected by an intercom connection line, and the processor is configured to execute code stored in the memory 604.

In one embodiment, when the code is executed, the processor 603 implements the method executed by the terminal device in the method embodiment. For brevity, it is not repeated here.

In one embodiment, when the code is executed, the processor 603 implements the method executed by the network device in the method embodiment. For brevity, it is not repeated here.

Figure 6:
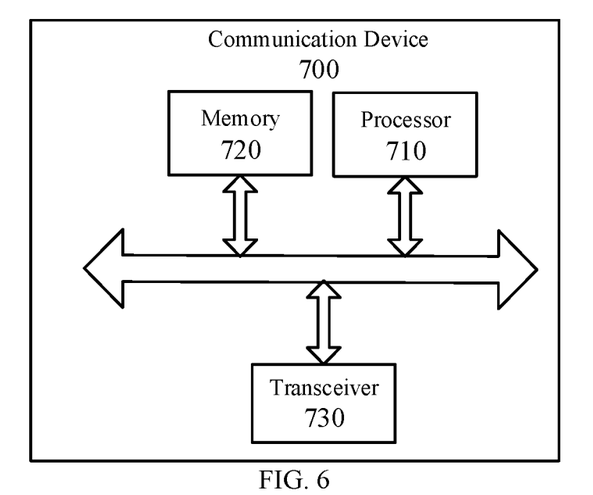
FIG. 6 is a schematic block diagram of a communication device according to an embodiment of the present application.

FIG. 6 is a schematic block diagram of a communication device 700 according to an embodiment of the present application. As shown in FIG. 6, the communication device 700 includes a processor 710 and a memory 720. The memory 720 may store program code, and the processor 710 may execute the program code stored in the memory 720.

In one embodiment, as shown in FIG. 6, the communication device 700 may include a transceiver 730, and the processor 710 may control the transceiver 730 to communicate externally.

In one embodiment, the processor 710 may call the program code stored in the memory 720 to perform the corresponding operations of the terminal device in the method embodiment. For brevity, details are not described herein again.

In one embodiment, the processor 710 may call the program code stored in the memory 720 to perform the corresponding operations of the network device in the method embodiment. For brevity, details are not described herein again.

It should be understood that the processor in the embodiment of the present application may be an integrated circuit chip and has a signal processing capability. In the implementation process, each step of the foregoing method embodiment may be completed by using an integrated logic circuit of hardware in a processor or an instruction in a form of software. The above processor may be a general-purpose processor, a digital signal processor (DSP), an application specific integrated circuit (ASIC), a field programmable gate array (FPGA), or other programmable logic devices, discrete gate or transistor logic devices, discrete hardware components. Various methods, steps, and logical block diagrams disclosed in the embodiments of the present application may be implemented or executed. A general-purpose processor may be a microprocessor or the processor may be any conventional processor or the like. The steps of the method disclosed in combination with the embodiments of the present application may be directly implemented by a hardware decoding processor, or may be performed by using a combination of hardware and software modules in the decoding processor. A software module may be located in a mature storage medium such as a random access memory, a flash memory, a read-only memory, a programmable read-only memory, or an electrically erasable programmable memory, a register, and the like. The storage medium is located in the memory, and the processor reads the information in the memory and completes the steps of the above method in combination with its hardware.

It can be understood that the memory in the embodiment of the present application may be a volatile memory or a non-volatile memory, or may include both volatile and non-volatile memory. The non-volatile memory may be a read-only memory (ROM), a programmable read-only memory (PROM), an erasable programmable read-only memory (Erasable PROM, EPROM), or Erase programmable EPROM (EEPROM) or flash memory. The volatile memory may be a Random Access Memory (RAM), which is used as an external cache. By way of example but not limitation, many forms of RAM are available, such as static random access memory (SRAM), dynamic random access memory (DRAM), synchronous dynamic random access memory (Synchronous DRAM, SDRAM), double data rate synchronous dynamic random access memory (Double SDR, DDR SDRAM), enhanced synchronous dynamic random access memory (Enhanced SDRAM, ESDRAM), synchronous connection dynamic random access memory (Synchlink DRAM, SLDRAM) and direct memory bus random access memory (Direct Rambus RAM, DR RAM). It should be noted that the memory of the systems and methods described herein is intended to include, but is not limited to, these and any other suitable types of memory.

Those of ordinary skill in the art may realize that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. A professional technician can use different methods to implement the described functions for each specific application, but such implementation should not be considered to be beyond the scope of this application.

Those skilled in the art can clearly understand that, for the convenience and brevity of description, the specific working processes of the systems, devices, and units described above can refer to the corresponding processes in the foregoing method embodiments, and are not repeated here.

In the several embodiments provided in this application, it should be understood that the disclosed systems, devices, and methods may be implemented in other ways. For example, the device embodiments described above are only schematic. For example, the division of the unit is only a logical function division. In actual implementation, there may be another division manner. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, that is, may be located in one place, or may be distributed on multiple network units. Some or all of the units may be selected according to actual needs to achieve the objective of the solution of this embodiment.

In addition, each functional unit in each embodiment of the present application may be integrated into one processing unit, or each of the units may exist separately physically, or two or more units may be integrated into one unit.

When the functions are implemented in the form of software functional units and sold or used as independent products, they can be stored in a computer-readable storage medium. Based on this understanding, the technical solution of the present application is essentially a part that contributes to the existing technology or a part of the technical solution can be embodied in the form of a software product. The computer software product is stored in a storage medium including several instructions, which are used to cause a computer device (which may be a personal computer, a server, or a network device, etc.) to perform all or part of the steps of the method described in each embodiment of the present application. The foregoing storage media include: U disks, mobile hard disks, read-only memory (ROM), random access memory (RAM), magnetic disks, or compact discs, which can store program codes.

The above is only a specific implementation of this application, but the scope of protection of this application is not limited to this. Any person skilled in the art can easily think of changes or replacements within the technical scope disclosed in this application. It should be covered by the protection scope of this application. Therefore, the protection scope of this application shall be subject to the protection scope of the claims.

What is claimed is:

1. A sounding reference signal (SRS) transmission method, comprising:
   receiving, by a terminal device, downlink control information (DCI), wherein the DCI comprises SRS trigger information;
   determining, by the terminal device, a transmission latency K according to a first high layer signaling;
   transmitting, by the terminal device, an SRS on an SRS resource in an SRS resource set indicated by the SRS trigger information, according to the transmission latency K, at a Kth time-domain resource unit after receiving the DCI, wherein K is an integer greater than or equal to zero; and
   determining the transmission latency K according to a subcarrier spacing used for SRS transmission triggered by the SRS trigger information and/or a subcarrier spacing corresponding to a bandwidth part (BWP) receiving the DCI.

2. The SRS transmission method according to claim 1, wherein, the method further comprises:
   determining the transmission latency K from SRS transmission latency indication information in the first high layer signaling.

3. The SRS transmission method according to claim 1, wherein, the method further comprises:
   determining the transmission delay K according to a DCI format of the DCI.

4. The SRS transmission method according to claim 3, wherein, the determining the transmission delay K according to the DCI format of the DCI comprises:
   determining the transmission delay M of the PUSCH from the PUSCH time-domain resource indication information in the DCI, if the DCI format of the DCI is used to schedule PUSCH transmission; and
   determining the transmission delay K, based on the transmission delay M.

5. The SRS transmission method according to claim 1, wherein, the transmitting the SRS on the SRS resource in the SRS resource set indicated by the SRS trigger information comprises:
   transmitting an SRS signal on each of the SRS resources included in each of the SRS resource sets indicated by the SRS trigger information, at the Kth time-domain resource unit, wherein the time-domain resource unit is a slot.

6. The SRS transmission method according to claim 1, wherein, the transmitting the SRS on the SRS resource in the SRS resource set indicated by the SRS trigger information comprises:
   transmitting the SRS on the SRS resource in the SRS resource set indicated by the SRS trigger information in a slot where the DCI is located, wherein a value of K is zero, wherein the time-domain resource unit is a slot.

7. The SRS transmission method according to claim 1, wherein, the method further comprises:
   if the DCI further includes a transmission power control (TPC) command for SRS power control, performing power control on the SRS transmission by using the TPC command.

8. The SRS transmission method according to claim 1, wherein, the transmitting the SRS on the SRS resource in the SRS resource set indicated by the SRS trigger information comprises:
   transmitting the SRS on the SRS resource in a currently activated BWP, if the SRS trigger information has indicated the SRS resource sets on a plurality of BWPs, or has indicated the SRS resource set including the SRS resources on a plurality of BWPs.

9. The SRS transmission method according to claim 1, wherein, the time-domain resource unit is a slot, or a sub-frame, or an orthogonal frequency division multiplexed (OFDM) symbol, or a micro slot, or PUSCH/PDSCH transmission duration.

10. A terminal device, comprising a communication unit and a processing unit, wherein, the communication unit is configured to: receive downlink control information (DCI), wherein the DCI comprises SRS trigger information;

the processing unit is configured to: determine a transmission latency K according to a first high layer signaling;

the communication unit is further configured to: transmit an SRS on an SRS resource in an SRS resource set indicated by the SRS trigger information, according to the transmission latency K, at a Kth time-domain resource unit after receiving the DCI, wherein K is an integer greater than or equal to zero; and the processing unit is further configured to: determine the transmission latency K, according to a subcarrier spacing used for SRS transmission triggered by the SRS trigger information and/or a subcarrier spacing corresponding to a BWP receiving the DCI.

11. The terminal device according to claim 10, wherein, the processing unit is further configured to:

determine the transmission latency K from SRS transmission latency indication information in the first high layer signaling.

12. The terminal device according to claim 10, wherein, the processing unit is further configured to:

determine the transmission delay K according to a DCI format of the DCI.

13. The terminal device according to claim 12, wherein, the processing unit is further configured to:

determine the transmission delay M of the PUSCH from the PUSCH time-domain resource indication information in the DCI, if the DCI format of the DCI is used to schedule PUSCH transmission; and determine the transmission delay K, based on the transmission delay M.

14. The terminal device according to claim 10, wherein, the processing unit is further configured to:

transmit an SRS signal on each of the SRS resources included in each of the SRS resource sets indicated by the SRS trigger information, at the Kth time-domain resource unit, wherein the time-domain resource unit is a slot.

15. The terminal device according to claim 10, wherein, the communication unit is further configured to:

transmit the SRS on the SRS resource in the SRS resource set indicated by the SRS trigger information in a slot where the DCI is located, wherein a value of K is zero, wherein the time-domain resource unit is a slot.

16. The terminal device according to claim 10, wherein, the processing unit is further configured to:

if the DCI further includes a transmission power control (TPC) command for SRS power control, perform power control on the SRS transmission by using the TPC command.

* * * * *